(12) United States Patent
Halcom et al.

(10) Patent No.: US 10,538,311 B2
(45) Date of Patent: Jan. 21, 2020

(54) PROPELLER DIVERTER DUCT

(71) Applicant: Sikorsky Aircraft Corporation, Stratford, CT (US)

(72) Inventors: Lance Halcom, Coppell, TX (US); Bryan Kenneth Baskin, Arlington, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 372 days.

(21) Appl. No.: 15/512,775

(22) PCT Filed: Sep. 17, 2015

(86) PCT No.: PCT/US2015/050672
§ 371 (c)(1),
(2) Date: Mar. 20, 2017

(87) PCT Pub. No.: WO2016/048785
PCT Pub. Date: Mar. 31, 2016

(65) Prior Publication Data
US 2017/0291689 A1 Oct. 12, 2017

Related U.S. Application Data

(60) Provisional application No. 62/053,549, filed on Sep. 22, 2014.

(51) Int. Cl.
*B64C 11/00* (2006.01)
*B64C 27/82* (2006.01)
*B64C 27/10* (2006.01)
*B64C 27/20* (2006.01)
(Continued)

(52) U.S. Cl.
CPC ............ *B64C 11/001* (2013.01); *B64C 27/10* (2013.01); *B64C 27/20* (2013.01); *B64C 27/30* (2013.01); *B64C 27/82* (2013.01); *B64C 11/02* (2013.01); *B64C 2027/8254* (2013.01)

(58) Field of Classification Search
CPC ....... B64C 11/02; B64C 11/001; B64C 27/20; B64C 27/82; B64C 2027/8236; B64C 2027/8254; B64C 2027/8272
See application file for complete search history.

(56) References Cited

U.S. PATENT DOCUMENTS

| 3,260,482 | A | * | 7/1966 | Stroukoff | ................ B64C 27/82 244/51 |
| 4,905,932 | A | * | 3/1990 | Piasecki | .................. B64C 27/82 244/17.19 |
| 5,123,613 | A |   | 6/1992 | Piasecki | |

(Continued)

OTHER PUBLICATIONS

ISR/WO, dated Dec. 17, 2015, U330379PCT, PCT Application No. PCT/US15/50672, 13 pages.

*Primary Examiner* — Philip J Bonzell
*Assistant Examiner* — Tye William Abell
(74) *Attorney, Agent, or Firm* — Cantor Colburn LLP

(57) ABSTRACT

A diverter duct for a propeller includes a second duct element having a semi-annular wedge shape, which is pivotably coupled to the first duct element, a first drive structure configured to drive a pivoting of the second duct element relative to the first duct element and a second drive structure configured to drive a rotation of the first and second duct elements about an axis of rotation of the propeller.

15 Claims, 5 Drawing Sheets

(51) Int. Cl.
*B64C 27/30* (2006.01)
*B64C 11/02* (2006.01)

(56) References Cited

U.S. PATENT DOCUMENTS

| | | |
|---|---|---|
| 5,131,603 A | 7/1992 | Meyers |
| 5,277,381 A | 1/1994 | Piasecki |
| 7,032,861 B2 | 4/2006 | Sanders et al. |
| 8,636,242 B2 | 1/2014 | Smith |
| 2006/0049304 A1* | 3/2006 | Sanders, Jr. ............ B64C 27/12 244/23 A |
| 2008/0237392 A1* | 10/2008 | Piasecki ................. B64C 27/26 244/6 |
| 2011/0111652 A1 | 5/2011 | Lin |
| 2016/0207618 A1* | 7/2016 | Darrow, Jr. ............ B64C 27/10 |

* cited by examiner

PROPELLER DIVERTER DUCT

This application is a National Phase Application of Patent Application PCT/US15/50672 filed on Sep. 17, 2015, which claims the benefit of and priority to U.S. Provisional Patent Application Ser. No. 62/053,549 filed on Sep. 22, 2014. The entire contents of PCT Application No. PCT/US15/50672 and U.S. provisional patent application Ser. No. 62/053,549 are incorporated herein by reference.

BACKGROUND OF THE INVENTION

The subject matter disclosed herein relates to a propeller diverter duct and, more particularly, to a propeller diverter duct for use with an aircraft.

Certain aircraft are configured as compound helicopters with coaxial, counter-rotating main rotors and propulsor/propellers. In such cases, a particular aircraft includes an airframe that is formed to define a cabin to accommodate a pilot and one or more crewmen and/or passengers. The airframe has an upper pylon section and a tail and the aircraft may further include a coaxial, counter-rotating main rotor apparatus operably disposed at the upper pylon section and a propeller apparatus operably disposed at the tail.

It has been found, however, during transitions to high speed forward flight, these types of aircraft experience rotor downwash effects that may cause the tail to drag. Thus, the aircraft may require a large amount of longitudinal cyclic control.

BRIEF DESCRIPTION OF THE INVENTION

According to one aspect of the invention, a diverter duct for a propeller includes a second duct element having a semi-annular wedge shape, which is pivotably coupled to the first duct element, a first drive structure configured to drive a pivoting of the second duct element relative to the first duct element and a second drive structure configured to drive a rotation of the first and second duct elements about an axis of rotation of the propeller.

In addition to one or more of the features described above, or as an alternative, the first duct element includes a planar leading edge and a curved or canted trailing edge.

In addition to one or more of the features described above, or as an alternative, the curved or canted trailing edge forms a wide duct section from which the second duct element is pivotable from a stowed position to an active position.

In addition to one or more of the features described above, or as an alternative, a portion of the first duct element is disposed to overlap with a portion of the second duct element.

In addition to one or more of the features described above, or as an alternative, the first drive structure includes one of a linear and a rotary actuator and the second drive structure includes a rotary actuator.

In addition to one or more of the features described above, or as an alternative, the first and second drive structures are controllable via wired or wireless connections.

In addition to one or more of the features described above, or as an alternative, the first duct element has a larger profile at one circumferential position than at another circumferential position where the first duct element has a smaller profile.

In addition to one or more of the features described above, or as an alternative, a trailing edge of the first duct element has a converging shape where the first duct element has the smaller profile.

In addition to one or more of the features described above, or as an alternative, the pivoting of the second duct element relative to the first duct element and the rotation of the first and second duct elements about the axis of rotation of the propeller augment flight controls.

In addition to one or more of the features described above, or as an alternative, the pivoting of the second duct element relative to the first duct element and the rotation of the first and second duct elements about the axis of rotation of the propeller augment yaw control or the aircraft.

According to another aspect of the invention, an aircraft is provided and includes an airframe having an upper pylon section and a tail, a coaxial, counter-rotating main rotor apparatus operably disposed at the upper pylon section, a propeller apparatus operably disposed at the tail and at least one diverter duct disposed proximate to the propeller apparatus.

In addition to one or more of the features described above, or as an alternative, further embodiments include a flight computer configured to control respective operations of the first and second drive structures.

In addition to one or more of the features described above, or as an alternative, further embodiments include horizontal stabilizer elements at the tail, a leading edge of the first duct element of the at least one diverter duct being axially interposed between the horizontal stabilizer elements and the propeller.

According to another aspect of the invention, a diverter duct for a propeller of a compound helicopter is provided. The diverter duct includes a first duct element, which is supportable about the propeller, the first duct element having an annular shape, a second duct element having a semi-annular wedge shape, which is pivotably coupled to the first duct element, a first drive structure configured to drive a pivoting of the second duct element relative to the first duct element in a direction oriented transversely relative to a longitudinal axis of a tail of the helicopter and a second drive structure configured to drive a rotation of the first and second duct elements about an axis of rotation of the propeller, which is substantially parallel with the longitudinal axis of the tail.

In addition to one or more of the features described above, or as an alternative, the first duct element comprises a planar leading edge and a curved or canted trailing edge, which forms a wide duct section from which the second duct element is pivotable from a stowed position to an active position, and a portion of the first duct element is disposed to overlap with a portion of the second duct element with the second duct element disposed in the stowed position.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a duct system for a tail mounted propulsor/propeller for an aircraft is provided and includes a diverter that can pivot about an axis defined generally horizontally and perpendicularly to the thrust line of action for the propulsor/propeller. The diverter would be designed to be concealed by the duct to maintain a relatively small drag signature and to contribute a longitudinal pitch/yaw force to the aircraft when actuated. In addition, the duct may be swiveled about the prop axis to provide for yaw control enhancement during flight conditions.

Figure 1:
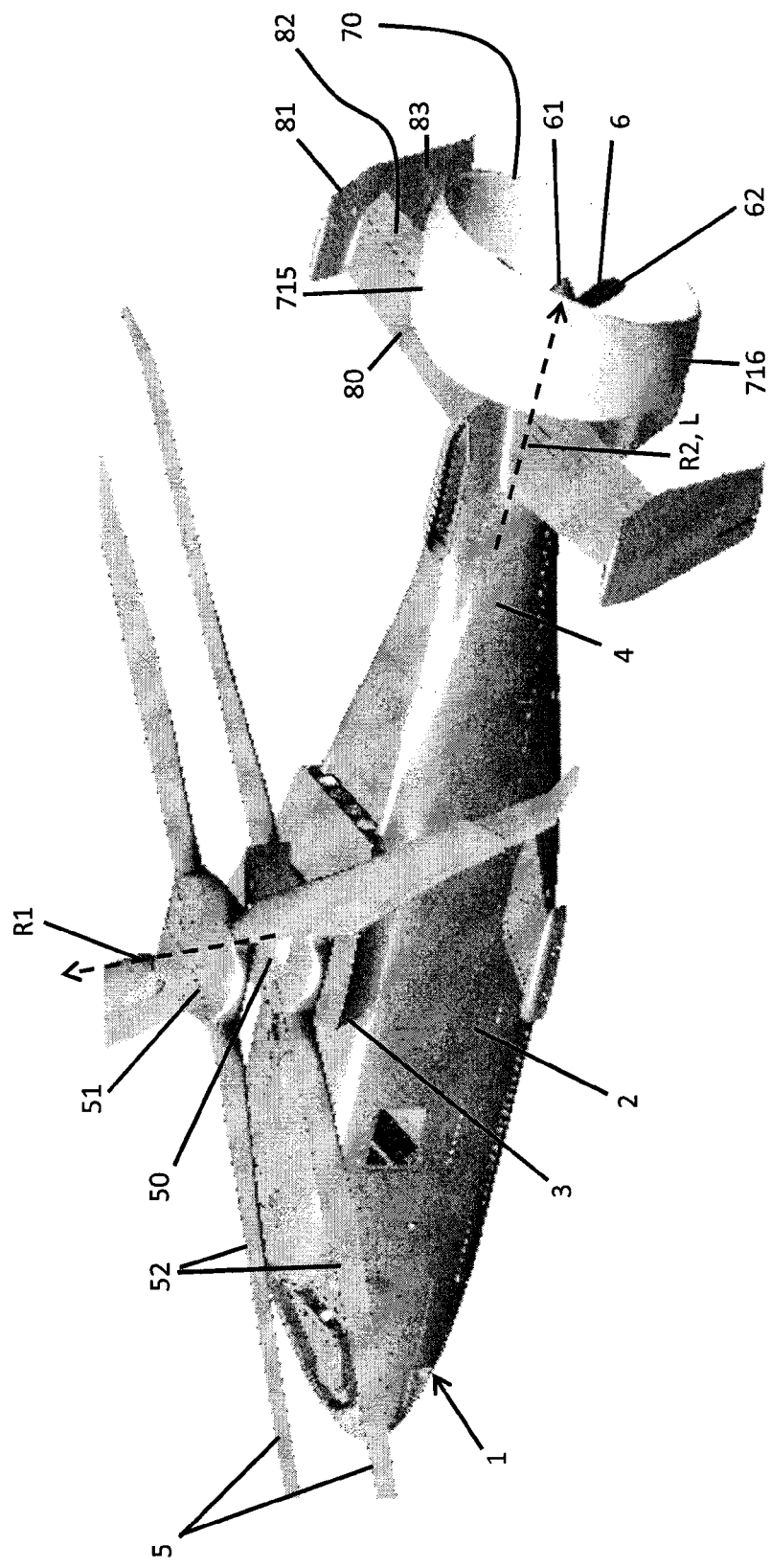
FIG. 1 is a perspective view of an aircraft in accordance with embodiments.
Figure 3:
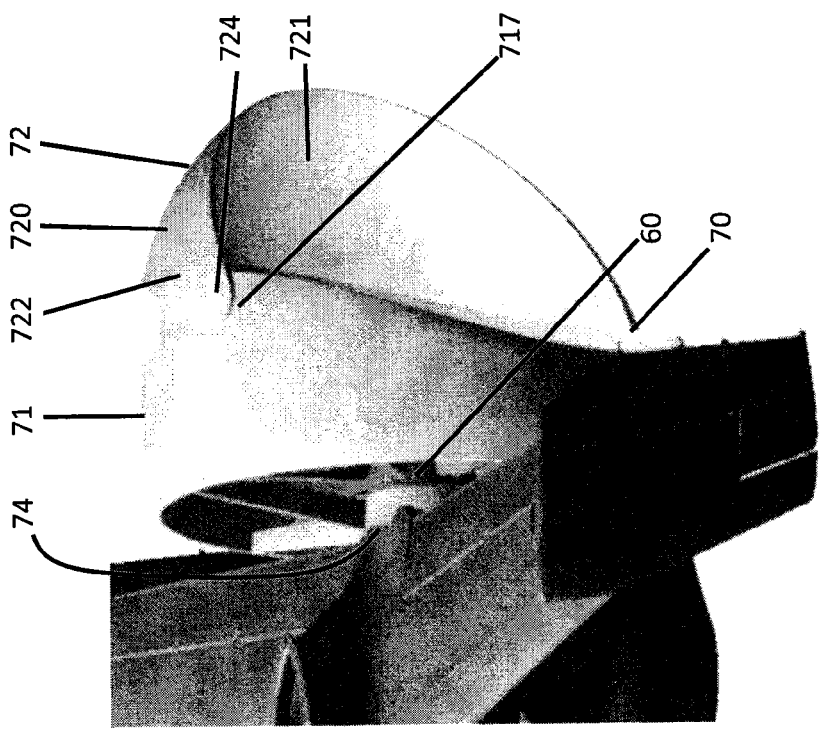
FIG. 3 is an enlarged perspective view of the portion of the tail of the aircraft of FIG. 1.
Figure 2:
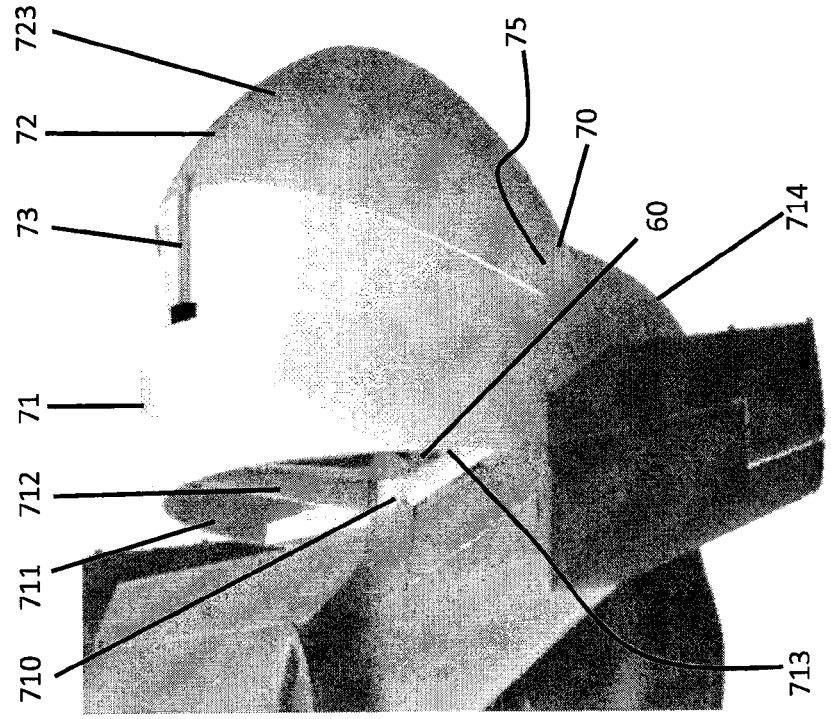
FIG. 2 is an enlarged perspective view of a portion of a tail of the aircraft of FIG. 1.

With reference to FIGS. 1-3, an aircraft 1 is provided and may be configured as a compound helicopter with a coaxial, counter-rotating main rotor and a propulsor/propeller. The aircraft 1 includes an airframe 2 that is formed to define a cabin to accommodate a pilot and one or more crewmen and/or passengers. The airframe 2 has an upper pylon section 3 and a tail 4 and, in accordance with embodiments, the aircraft 1 may further include a coaxial, counter-rotating main rotor apparatus 5 operably disposed at the upper pylon section 3, a propulsor/propeller apparatus 6 operably disposed at the tail 4 and a flight computer 7 (see FIGS. 4 and 5) accommodated within the airframe 2.

The coaxial, counter-rotating main rotor apparatus 5 includes a rotor shaft 50 disposed to define a first axis of rotation R1, a hub 51 disposed on the rotor shaft 50 and rotor blades 52 extending radially outward from the hub 51. The propulsor/propeller apparatus 6 similarly includes a propulsor/propeller shaft 60 (see FIGS. 2 and 3), a hub 61 disposed on the propulsor/propeller shaft 60 to define a second axis of rotation R2, which is substantially parallel with a longitudinal axis L of the tail 4 and propulsor/propeller blades 62 extending radially outward from the hub 61. The second axis of rotation R2 is defined along and in parallel with the thrust line of action of the propulsor/propeller apparatus 6.

Although the aircraft 1 is described herein and illustrated in the figures as a compound helicopter with a coaxial, counter-rotating main rotor and a propulsor/propeller, it is to be understood that this configuration is not required and that the aircraft 1 may have other configurations and components not particularly described. Such alternative configurations may include, but are not limited to, single-rotor helicopters with or without propulsors/propellers, dual-rotor helicopters with or without propulsors/propellers where the dual-rotors are not coaxial and helicopters with coaxial, counter-rotating main rotors with one or more propulsors/propellers on sides of the airframe.

Although not shown in FIG. 1, the aircraft also includes an engine configured to generate motive power and a transmission system disposed to transmit the motive power to the coaxial, counter-rotating main rotor apparatus 5 and the propulsor/propeller apparatus 6. Such transmission of motive power drives rotations of the coaxial, counter-rotating main rotor apparatus 5 such that the respective rotor blades 52 rotate relative to the airframe 2 about the hub 51 and the first axis of rotation R1 to generate at least lift for the aircraft 1. Similarly, the transmission of the motive power to the propulsor/propeller apparatus 6 drives rotations of the propulsor/propeller apparatus 6 such that the propulsor/propeller blades 62 rotate relative to the airframe 2 about the hub 61 and the second axis of rotation R2 to generate at least thrust for the aircraft 1.

The aircraft 1 further includes at least one diverter duct 70, which is disposed proximate to and configured for use with the propulsor/propeller apparatus 6, and, in some embodiments, horizontal stabilizer elements 80 disposed at and along the tail 4. As shown in FIGS. 2 and 3, the diverter duct 70 includes a first duct element 71 having an annular shape, a second duct element 72 having a semi-annular wedge shape, which is pivotably coupled to the first duct element 71, a first drive structure 73 and a second drive structure 74. As will be described in greater details below, the first drive structure 73 and the second drive structure 74 can be used to augment flight controls of the aircraft 1 and, in particular, can be used to augment yaw control.

In accordance with embodiments, the first duct element 71 includes an inner annular portion 710, an outer annular portion 711 and a plurality of vanes 712. Each of the plurality of vanes 712 is oriented substantially radially to support the outer annular portion around the inner annular portion 710 such that the inner and outer annular portions 710 and 711 define a flow path through which air can be drawn into the propulsor/propeller apparatus 6. The inner annular portion 710 may have dimensions (i.e., a diameter and surface curvatures) similar to those of local portions of the tail 4 and a diameter of the outer annular portion 711 may be slightly larger than a disk defined by the rotation of the propulsor/propeller blades 62. The inner annular portion 710 and the plurality of the vanes 712 may have similar axial lengths and the plurality of the vanes 712 may be disposed forward of the propulsor/propeller blades 62. The outer annular portion 711 may have an axial length that extends over and past the propulsor/propeller blades 62. The second duct element 72 has a semi-annular wedge shaped body 720 with a first surface 721, a second surface 722, a relatively wide central portion 723 and tapered, narrow portions 724 at opposite ends of the central portion 721. The body 720 is curved such that the first surface 721 at the tapered, narrow portions 724 faces itself on the opposite side. The second duct element 72 may be coupled to the first duct element 71 via hinges 75 at the tapered narrow portions 724.

The first drive structure 73 is configured to drive a pivoting action of the second duct element 72 relative to the first duct element 71 about respective axes of the hinges 75. This pivoting action may be directed in a direction oriented transversely relative to the longitudinal axis L of the tail 4 and permits the second duct element 72 to occupy and move between a stowed position and active or longitudinal pitch/yaw force generating positions. As will be described below, the stowed position is characterized in that the second duct element 72 is aerodynamically concealed by the first duct element 71 such that a drag signature of the second duct element 72 is reduced. The longitudinal pitch/yaw force generating positions are characterized in that the second duct element 72 is pivoted away from the first duct element 71 and thus contributes to the generation of a longitudinal pitch/yaw force applicable to the aircraft 1.

Figure 4:
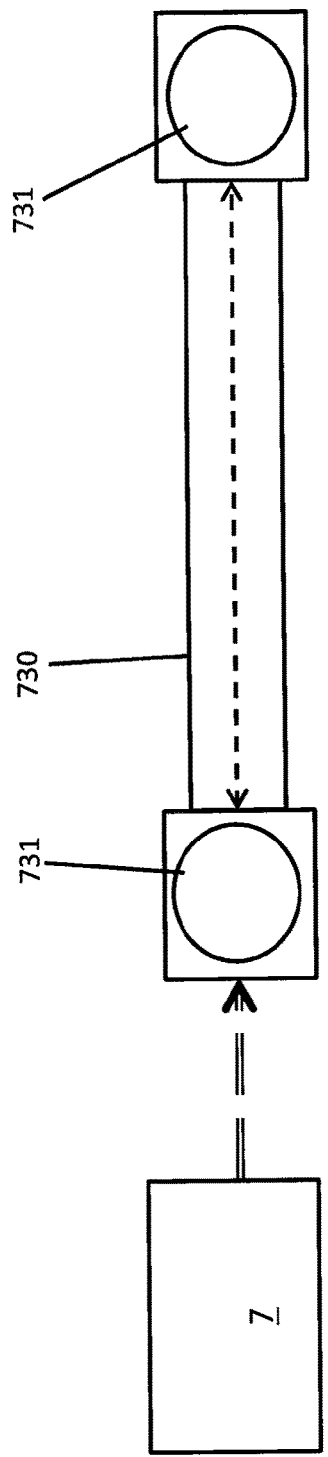
FIG. 4 is a schematic diagram of an operation of a first drive structure in accordance with embodiments.

In accordance with embodiments and, with reference to FIG. 4, the first drive structure 73 may include one of a rotary actuator and a linear actuator 730 and couplings 731. The couplings 731 are disposed at opposite ends of the linear actuator 730 and serve to couple the opposite ends of the linear actuator 730 to the first and second duct elements 71 and 72, respectively. The linear actuator 730 is extendible and retractable along a longitudinal axis thereof to pivot the second duct element 72 away from the first duct element 71 and about the axes of the hinges 75 (i.e., from the stowed position to the longitudinal pitch/yaw force generating positions) and to draw the second duct element 72 back toward the first duct element 71 (i.e., from the longitudinal pitch/yaw force generating positions to the stowed position). The linear actuator 730 may be controllable by the flight computer 7 via wired or wireless connections.

The second drive structure 74 is configured to drive a rotation of the first duct element 71 and the second duct element 72 about the second axis of rotation R2. Such rotation provides for yaw control enhancement for the aircraft 1 during flight conditions where command input and authority may be limited. This yaw control enhancement may be increased by pairing the rotation with an actuation of the first drive structure 73 that drives a pivoting of the second duct element 72 toward the longitudinal pitch/yaw force generating positions.

Figure 5:
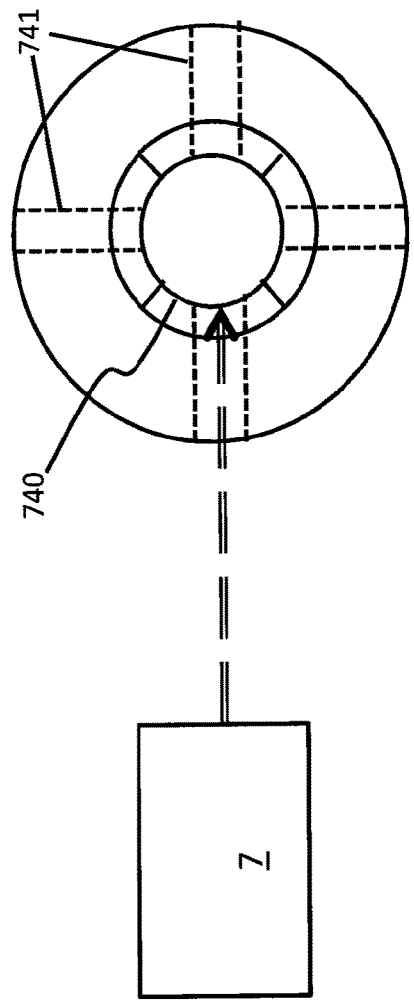
FIG. 5 is a schematic diagram of an operation of a second drive structure in accordance with embodiments.

In accordance with embodiments and, with reference to FIG. 5, the second drive structure 74 may include a rotary actuator 740 and couplings 741. The couplings 741 serve to rotatably couple the rotary actuator 740 to the airframe 2 and to the first duct element 71 (i.e., the inner annular portion 710) such that the rotary actuator 740 can rotate the first duct element 71 relative to the airframe about the second axis of rotation R2. The rotary actuator 740 maybe drivable in first and second opposite directions and may be controllable by the flight computer 7 via wired or wireless connections.

The horizontal stabilizer elements 80 extend outwardly from the tail 4 at an axial location defined proximate to but forward of the propulsor/propeller apparatus 6. Distal ends of the horizontal stabilizer elements 80 may be coupled to vertical aerodynamic features 81 that operate in concert with the horizontal stabilizer elements 80 to maintain controlled flight of the aircraft 1. In accordance with further embodiments, the horizontal stabilizer elements 80 may also include active control surfaces 82 that can be maneuvered in at least vertical directions to enhance flight control of the aircraft 1 (similar active control surfaces 82 may also be provided on the vertical aerodynamic features 81 and would be maneuverable in at least horizontal directions to enhance flight control of the aircraft 1). In accordance with embodiments, a leading edge 713 of the first duct element 71 may be axially interposed between the trailing edges of the horizontal stabilizer elements 80 and the respective leading edges of the propulsor/propeller blades 62.

The flight computer 7 may be accommodated within the airframe 2 and is configured to control various flight operations of the aircraft 1 in accordance with current conditions, mission plans and pilot inputted commands. In so doing, the flight computer 7 controls operations of the engine, the transmission system, the cyclic and collective pitch of the rotor blades 52 and the propulsor/propeller blades 62, the horizontal stabilizer elements 80 and the maneuvering of the active control surfaces 82. The flight computer 7 also controls the various operations of the first and second drive structures 73 and 74.

As to the control of the first drive structure 73, the flight computer 7 is configured to control the linear actuator 730 to maintain the second duct element 72 in the stowed position where current conditions, mission plans and pilot inputted commands dictate that generation of the longitudinal pitch/yaw force is not needed. Conversely, the flight computer 7 is configured to control the linear actuator 730 to pivot the second duct element 72 toward the longitudinal pitch/yaw force generating positions where the current conditions, mission plans and pilot inputted commands dictate that generation of the longitudinal pitch/yaw force is needed. As to the control of the second drive structure 74, the flight computer 7 is configured to control the rotary actuator 740 to drive both forward and reverse rotations of the first duct element 71 and the second duct element 72 about the second axis of rotation R2 where current conditions, mission plans and pilot inputted commands dictate that enhanced yaw control of the aircraft 1 is needed.

With reference to FIGS. 1-3 and FIGS. 6A-6E, the leading edge 713 of the first duct element 71 may be provided as a substantially planar (or substantially/mostly vertically oriented) leading edge whereas a trailing edge 714 of the first duct element 71 may be canted or may have a multiple inflexion point curvature. This canting or curvature forms a wide duct section 715, a narrow duct section 716 that is circumferentially opposed to the wide duct section 715 and tapered duct sections 717 running curvi-linearly from the wide duct section 715 to the narrow duct section 716. The hinges 75 may couple the second duct element 72 to the first duct element 71 at the tapered duct sections 717. In accordance with embodiments, the second duct element 72 at least partially overlaps with the trailing edge 714 when the second duct element 72 is disposed in the stowed position. The second duct element 72 may extend from a distal extent of the trailing edge 714 when pivoting to the active or longitudinal pitch/yaw force generating positions.

Figure 6A:
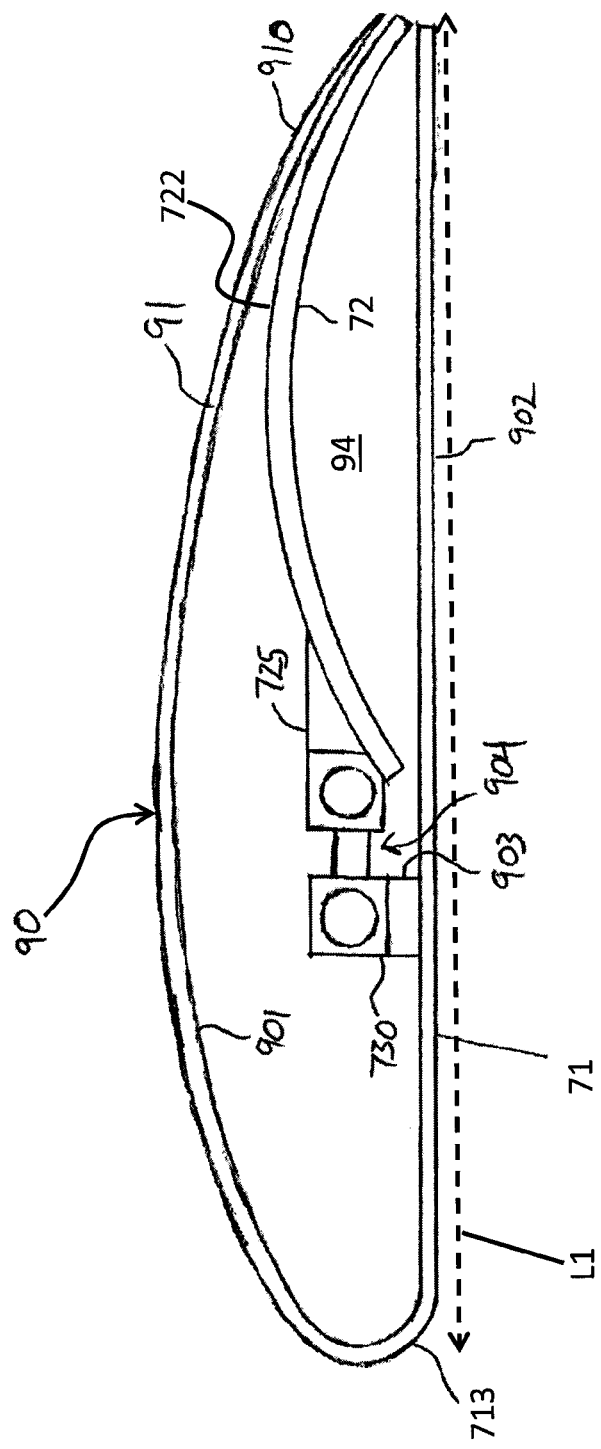
FIG. 6A is a schematic side view of an overlap of first and second duct elements at a 12:00 position of the portion of the tail of FIGS. 2 and 3.
Figure 6B:
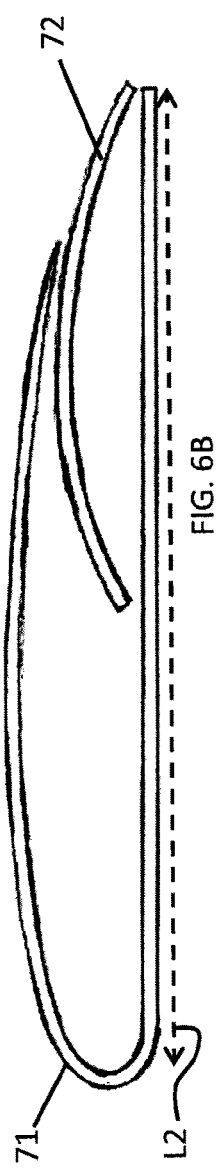
FIG. 6B is a schematic side view of 10:30 and 1:30 positions of the portion of the tail of FIGS. 2 and 3.
Figure 6C:
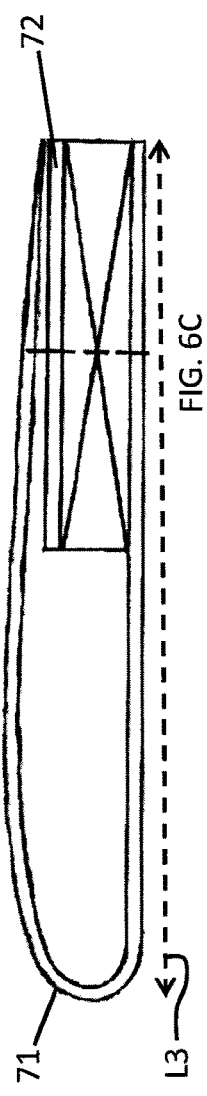
FIG. 6C is a schematic side view of 9:00 and 3:00 positions of the portion of the tail of FIGS. 2 and 3.
Figure 6D:
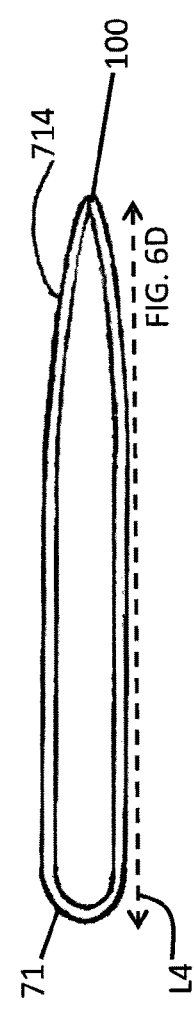
FIG. 6D is a schematic side view of 7:30 and 4:30 positions of the portion of the tail of FIGS. 2 and 3.
Figure 6E:
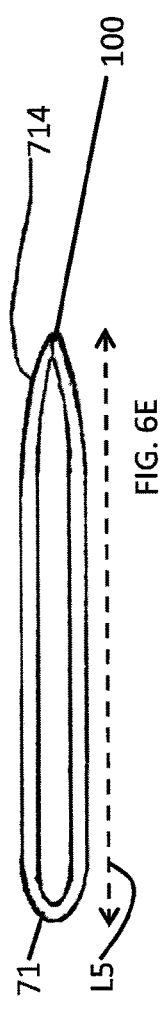
FIG. 6E is a schematic side view of a 6:00 position of the portion of the tail of FIGS. 2 and 3.

As shown in FIG. 6A, the first duct element 71 includes a central portion 90, which is axially interposed between the leading edge 713 and the trailing edge 714, and a flange 91. At the central portion 90, the first duct element 71 has a first axially oriented portion 901 at a first radial plane, a second axially oriented portion 902 at a second radial plane defined closer to the second axis of rotation R2 than the first radial plane and a radially oriented portion 903. The flange 91 extends axially in the aft direction to define an open-ended annulus 94 aft of the radially oriented portion 903 and radially between an interior facing surface of the flange 91 and an exterior facing surface of the second axially oriented portion 902.

The linear actuator 730 of the first drive structure 73 may be disposed at the radially oriented portion 903. In this position, a first actuation of the linear actuator 730 drives a leading edge 725 of the second duct element 72 out of the open-ended annulus 94 when the second duct element 72 is to be pivoted from the stowed position to the longitudinal pitch/yaw force generating positions. Conversely, a second actuation of the linear actuator 730 drives the leading edge 725 into the open-ended annulus 94 when the second duct element 72 is pivoted from the longitudinal pitch/yaw force generating positions to the stowed position.

In accordance with embodiments, the stowed position may be characterized in that the leading edge 725 is held within the open-ended annulus 94 such that the flange 91 extends over or overlaps the leading edge 725. In this position, a drag signature of the second duct element 72 is reduced by the shroud formed by the first duct element 71. In accordance with further embodiments, an exterior surface 910 of the flange 91 may be configured to run smoothly toward the second surface 722 so as to further limit the drag signature of the second duct element 72 and to present a smooth aerodynamic transition between the first duct element 71 and the second duct element 72.

In accordance with embodiments and, with further reference to FIGS. 6A-6E, the diverter duct 70 may have a larger profile at one circumferential position than at another circumferential position to generate or produce differential lift and may be configured to maintain a near-constant aperture for airflow out of the diverter duct 70 when the second duct element 72 is extended. Thus, as shown in FIGS. 6A-6E, the diverter duct 70 may have a first length L1 at the 12:00 circumferential position (see FIG. 6A), a second length L2 at the 10:30 and 1:30 circumferential positions (see FIG. 6B), a third length L3 at the 9:00 and 3:00 circumferential positions (see FIG. 6C), a fourth length L4 at the 7:30 and 4:30 circumferential positions (see FIG. 6D) and a fifth length L5 at the 6:00 circumferential position (see FIG. 6E). Moreover, the trailing edge 714 of the first duct element 71 may have a converging shape 100 around and between the 7:30 and 4:30 circumferential positions (see FIGS. 6D and 6E) to enhance lift performance of the diverter duct 70 and promote more laminar flow of air out of the diverter duct 70 when the second duct element 72 is extended or active in accordance with the Coanda effect.

In accordance with still further embodiments, the diverter duct 70 may be provided as a single feature or as a plurality of diverter ducts 70. In the former case, the single diverter duct 70 may be disposed along and about the second axis of rotation R2. In the latter case, the one or more diverter ducts 70 may be provided along and about the second axis of rotation R2 while one or more additional diverter ducts 70 may be provided at offset locations. Such additional diverter ducts 70 may be disposed to enhance the performance of the aircraft 1 in a similar manner as explained above and to further enhance the performance of another diverter duct 70.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A diverter duct for a propeller, the diverter duct comprising:
    a first duct element, which is supportable about the propeller, the first duct element having an annular shape;
    a second duct element having a semi-annular wedge shape, which is pivotably coupled to the first duct element;
    a first drive structure configured to drive a pivoting of the second duct element relative to the first duct element; and
    a second drive structure configured to drive a rotation of the first and second duct elements about an axis of rotation of the propeller.

2. The diverter duct according to claim 1, wherein a portion of the first duct element is disposed to overlap with a portion of the second duct element.

3. The diverter duct according to claim 1, wherein the first drive structure comprises one of a linear and a rotary actuator and the second drive structure comprises a rotary actuator.

4. The diverter duct according to claim 1, wherein the first and second drive structures are controllable via wired or wireless connections.

5. The diverter duct according to claim 1, wherein the pivoting of the second duct element relative to the first duct element and the rotation of the first and second duct elements about the axis of rotation of the propeller augment flight controls.

6. The diverter duct according to claim 1, wherein the pivoting of the second duct element relative to the first duct element and the rotation of the first and second duct elements about the axis of rotation of the propeller augment yaw control of an aircraft.

7. The diverter duct according to claim 1, wherein the first duct element comprises a planar leading edge and a curved or canted trailing edge.

8. The diverter duct according to claim 7, wherein the curved or canted trailing edge forms a duct section from which the second duct element is pivotable from a stowed position to an active position.

9. The diverter duct according to claim 1, wherein the first duct element has a larger profile at one circumferential position than at another circumferential position where the first duct element has a smaller profile.

10. The diverter duct according to claim 9, wherein a trailing edge of the first duct element has a converging shape where the first duct element has the smaller profile.

11. An aircraft, comprising:
    an airframe having an upper pylon section and a tail;
    a coaxial, counter-rotating main rotor apparatus operably disposed at the upper pylon section;
    a propeller apparatus operably disposed at the tail; and
    at least one diverter duct according to the diverter duct of claim 1 disposed proximate to the propeller apparatus.

12. The aircraft according to claim 11, further comprising a flight computer configured to control respective operations of the first and second drive structures.

13. The aircraft according to claim 11, further comprising horizontal stabilizer elements at the tail, a leading edge of the first duct element of the at least one diverter duct being axially interposed between the horizontal stabilizer elements and the propeller.

14. A diverter duct for a propeller of a compound helicopter, the diverter duct comprising:
    a first duct element, which is supportable about the propeller, the first duct element having an annular shape;
    a second duct element having a semi-annular wedge shape, which is pivotably coupled to the first duct element;
    a first drive structure configured to drive a pivoting of the second duct element relative to the first duct element in a direction oriented transversely relative to a longitudinal axis of a tail of the helicopter; and
    a second drive structure configured to drive a rotation of the first and second duct elements about an axis of rotation of the propeller, which is substantially parallel with the longitudinal axis of the tail.

15. The diverter duct according to claim 14, wherein:
the first duct element comprises a planar leading edge and a curved or canted trailing edge, which forms a duct section from which the second duct element is pivotable from a stowed position to an active position, and
a portion of the first duct element is disposed to overlap with a portion of the second duct element with the second duct element disposed in the stowed position.

* * * * *